United States Patent [19]
Chan et al.

[11] Patent Number: 6,057,830
[45] Date of Patent: *May 2, 2000

[54] TOUCHPAD MOUSE CONTROLLER

[75] Inventors: Chow Fong Chan; Mun Lan Ng Maisy; Eng Yue Ong; Xia Geng; Swee Hock Alvin Lim, all of Singapore, Singapore

[73] Assignee: Tritech Microelectronics International Ltd., Singapore, Singapore

[ * ] Notice: This patent issued on a continued prosecution application filed under 37 CFR 1.53(d), and is subject to the twenty year patent term provisions of 35 U.S.C. 154(a)(2).

[21] Appl. No.: 08/785,724

[22] Filed: Jan. 17, 1997

[51] Int. Cl.$^7$ ........................................ G09G 5/08
[52] U.S. Cl. .......................... 345/157; 345/159; 345/160; 345/163; 345/179
[58] Field of Search ..................................... 345/157, 156, 345/159, 160, 173, 179; 341/22, 34

[56] References Cited

U.S. PATENT DOCUMENTS

| | | | |
|---|---|---|---|
| 5,266,750 | 11/1993 | Yatsuzuka | 178/19 |
| 5,327,161 | 7/1994 | Logan et al. | 345/157 |
| 5,376,946 | 12/1994 | Mikan | 345/157 |
| 5,543,590 | 8/1996 | Gillespie et al. | 178/18 |
| 5,543,591 | 8/1996 | Gillespie et al. | 178/18 |
| 5,666,113 | 9/1997 | Logan | 341/34 |

*Primary Examiner*—Julie Lieu
*Attorney, Agent, or Firm*—George O. Saile; Stephen B. Ackerman; Billy J. Knowles

[57] ABSTRACT

Systems and methods for the detection of motions of a pointed object upon a digitizing surface such as a touchpad is disclosed. The motions will be detected and converted to digital codes representing the absolute coordinates of the pointed objects upon the touchpad. The absolute coordinates will be translated into a stroke signal to interpret a single tap, a double tap, and a tap and drag of the pointed object on the touchpad. Further, multiple sets of absolute coordinates will be translated into a relative motion code that will contain the speed and direction of the pointed object as it is moved across the touchpad. The absolute coordinates will be interpreted by an autocursor controller to determine if the pointed object has transited between a workzone and an edgezone of the touchpad. If the pointed object is in the edgezone, a predefined relative motion code will be transmitted as an autocursor code. The relative motion code, the stroke signal, and the autocursor code will converted to an industry standard computer input mouse protocol an transmitted to a computer system to control a cursor upon a display screen.

32 Claims, 7 Drawing Sheets

Press Action a tap, followed by touching
without movement

Drag Action a tap, followed by touching
and moving

TOUCHPAD MOUSE CONTROLLER

RELATED PATENT APPLICATIONS

The following applications are related to the present invention:

Title: A Method and System for Data Averaging For Pen-Input Devices, Ser. No. 08/785,629, Filing Date: Jan. 17, 1997, Assigned to the Same Assignee as the present invention.

Title: A Command Set For Touchpad Pen-Input Mouse, Ser. No. 08/785,726, Filing Date: Jan. 17, 1997, Assigned to the Same Assignee as the present invention.

Title: A Touchpad Pen-Input Controller, Ser. No. 08/785,738, Filing Date: Jan. 17, 1997, Assigned to the Same Assignee as the present invention.

Title: A Touchpad, Pen-Input and Mouse Controller, Ser. No. 08/785,739, Filing Date: Jan. 17, 1997, Assigned to the Same Assignee as the present invention.

Title: Automatic Cursor Motion Control for Touchpad Mouse, Ser. No. 08/815,033, Filing Date: Mar. 14, 1997, Assigned to the Same Assignee as the present invention.

Title: Multiplexed Analog-to-Digital Converter For Absolute and Relative Voltage Measurements, Ser. No. 08/785,735, Filing Date: Jan. 17, 1997, now issued as U.S. Pat. No. 5,736,949, Issue Date Apr. 7, 1998, Assigned to the Same Assignee as the present invention.

BACKGROUND OF THE INVENTION

FIELD OF THE INVENTION

The present invention relates to computer input devices such as a digitizers referred to as a touchpad for the control of a cursor upon a display screen of a computer system and more particularly to the systems and methods necessary to acquire signals from such input devices and to convert the acquired signals to digital codes that conform to industry standard computer input mouse protocols.

DESCRIPTION OF RELATED ART

Touchpads are small digitizer based input devices that are used to replace a computer input device commonly referred to a mouse. The touchpad digitizers may be of three types, capacitive, resistive and electromagnetic.

Referring to FIG. 1, the surface 12 of the touchpad becomes a "writing surface" for capturing the position of an pointed object 10 such as a finger, pen or stylus upon the touchpad. The touchpad signals are analog signals that will be captured by a touchpad interface circuit 28 and translated to digital codes that will be transferred to a computer system 32 on an interface 30. The interface 30 may be an industry standard serial interface, an industry standard parallel interface, or a custom interface requiring special adapter circuitry within the computer system 32 to accept the digital codes from the touchpad interface 28.

An example of a resistive touchpad is shown in FIG. 1. The resistive touchpad is made up of multiple layers of resistive films and protective layers. The protective hard coating 12 is the surface onto which the pointed object 10 is pressed upon. A first layer of resistive film 14 is attached to the protective hard coating 12 on the surface opposite the writing surface. This first layer of resistive film forms the Y-plane of the touchpad. Attached to the surface of the Y-plane resistive film 14 opposite the surface attached to the hard protective coating 12 is a second resistive film 16. This second resistive film 16 forms the X-plane of the touchpad. Finally attached to the side of the X-plane resistive film 16 is a supporting back layer 18. This back layer provides protection and mechanical support for the for the X-plane and Y-plane resistive films 14 and 16.

The touchpad interface 28 is connected through the touchpad interface lines 20, 22, 24, and 26. Each line will provide a stimulus such as a current or voltage to the periphery of the X-plane resistive film 16 a nd the Y-plane resistive film 14. As shown in FIG. 2, as the pointed object 10 is pressed 40 on the touchpad surface 12, the Y-plane resistive film 12 will deform and touch the X-plane resistive film 14. The X-plane resistive film can not deform because it is supported by the supporting back layer 18. This causes the Y-plane resistive film 14 and the X-plane resistive film 16 to come into contact with each other. This will cause a response in the form a change in voltage or current depending upon whether the stimulus from the touchpad interface 28 of FIG. 1 is a constant voltage or a constant current. If the stimulus from the touchpad interface 28 of FIG. 1 is a constant voltage the currents through the touchpad interface lines 20, 22, 24, and 26 will be modified according to the position of the pointed object 10 on the touchpad surface 12. However, if the stimulus from the touchpad interface 28 of FIG. 1 is a constant current the voltages between the touchpad interface lines 20, 22, 24, and 26 will be modified according to the position of the pointed object 10 on the touchpad surface 12.

Referring back to FIG. 1, the touchpad interface 28 will have a set of analog to digital converters that will sense the change in the analog responses from the touchpad interface lines 20, 22, 24, and 26 and convert them to digital codes indicating the absolute position of the pointed object 10 upon the touchpad surface 12. The digital codes may be transmitted directly to the computer system across the interface 30 and translated to absolute coordinates within the computer system or the touchpad interface 28 may determine the absolute coordinates and transmit them directly to the computer system 32. For the computer system 32 to use the absolute coordinates generated by the touchpad interface 28 to control the movement of the cursor 36 upon the display screen 34, the se absolute coordinates must be modified to codes that define the relative motion of the cursor 36. The relative motion will be the speed and direction of the cursor 36 as it is moved across the display screen 34. The modification from absolute coordinates to relative motion information must be done with in an internal mouse emulation program resident within the computer system 32.

If the touchpad is to emulate the mouse movements, when the cursor 36 is moved across the display screen 34 for a relatively long distance, the pointed object 10 must be repeatedly lifted and placed back on the touchpad surface 12 giving a "rowing" motion to get the cursor 36 to move the long distance. In traditional mouse operations, if the cursor 36 is to d rag an object being displayed upon the display screen 34 a button on the mouse is depressed while the mouse is moved. The button can be held depressed while the mouse is moved in the rowing motion to drag the object across the display screen 34. This is difficult to accomplish on the touchpad. If the pointed object 10 is lifted from the touchpad, the touchpad interface 28 will not be able to communicate the "rowing" motion to indicate that the cursor 36 is to travel a long distance.

Also, the touch pad interface 28 will not be able to communicate that there is an intention for the cursor 36 to drag the object on the display screen 34. Additional buttons must be added to the touchpad or special areas within the surface of the touch pad surface 12 in order for the touch pad interface 28 to communicate the desire for the cursor 36 to be moved long distances across the display screen 34 or that the cursor 36 is to drag objects upon the display screen 34.

U.S. Pat. No. 5,327,161 (Logan, et al.) use a method to emulate mouse input devices using a program resident within a computer system.

A touchpad input device has a controller that generates a digital code that contains the absolute position of a pen or finger on the mouse pad. This requires a special interface that is unique to the touchpad circuitry. Additionally, this patent describes a method for the continuation of cursor movement when a pointed object is touching the touchpad and has been moved on the touchpad to a special border area. The pointed object must be stopped within the border for the continuous motion to be engaged. The direction of the scrolling may be made as a modification of the original direction and velocity of the pen prior to the transiting and stopping within the border area of the touchpad. This modification will be made as a change in the velocity of the movement of the cursor along an axis parallel to the edge of the touchpad adjacent to the border area where the pointed object is resting.

U.S. Pat. No. 5,376,946 (Mikan) describes a circuit using an EPROM to convert signals from a touch screen adhered to a computer display screen to digital codes of the industry standard computer input mouse protocols.

U.S. Pat. No. 5,266,750 (Yatsuzuka) discloses a tablet input device and circuitry for providing stimulating voltages to the tablet input device and for sensing the response voltages from the tablet input device when the tablet input device is being pressed. The circuitry provides an OFF state wherein power to the tablet is minimized during a waiting period.

U.S. Pat. No. 5,543,590 (Gillespie, et al.) describes a capacitive sensor system that can detect the location of a finger or stylus on a sensor matrix. The location is determined and translated as electrical signals for use in other circuitry such as a computer system to control a cursor upon a display screen. Further this patent discusses an "edge motion" detection feature that will allow a finger or stylus within a "outer zone" of the sensor matrix to move the cursor to move across a display screen for long distances and avoid the "rowing" motion.

U.S. Pat. No. 5,543,591 (Gillespie, et al.) discloses methods for recognizing tapping, pushing, hopping and zigzagging gestures upon a conductive sensor pad that can be interpreted into cursor control motions such as clicking, double clicking, and click and drag use with computer mouse devices. Further this patent also describes the "edge motion" feature as described in U.S. Pat. No. 5,543,590 (Gillespie, et al.).

SUMMARY OF THE INVENTION

An object of this invention is the acquisition of signals from a computer input device such as a touchpad that represent the location of a pointed object such as finger, stylus, or pen upon the touchpad. Another object of this invention is the conversion of the acquired signals to digital codes that represent the location of the pointed object upon the touch pad. Yet another object of this invention is the conversion of the digital codes that represent the location of the pointed object upon the touchpad to digital codes that represent the speed and direction of movement of the pointed object upon the touchpad. Furthermore, another object of this invention is the translation of the digital codes representing the speed and motion of the pointed object upon the touchpad to a set of digital codes that conform to an industry standard mouse protocol. Still further another object of this invention is the interpretation of a touch and move, a tap, double tap and a tap, touch and with and without movement motion of the pointed object upon the touchpad into digital codes representing button actions of the industry standard mouse protocols. And still further, another object of this invention is interpreting of the digital codes representing the location of the pointed object upon the touchpad to determine when the pointed object has transited from a workzone area of the touchpad to an edgezone area of the touchpad and to translate this to the industry standard protocols indicating the speed and direction of pointed object prior to entry of the edgezone. Further yet, another object of this invention is the conservation of energy within the circuitry that will implement the aforementioned objects by removal of power from the circuits whenever the pointed object has not been detected upon the touchpad for a sufficiently long period of time.

To accomplish these and other objects a touchpad control system has a touchpad driver circuit to provide an electrical stimulus to the touchpad. Whenever the pointed object is in contact with the touchpad, an electrical response occurs that is detected by an analog-to-digital converter and converted to an analog-to-digital set of digital codes representing the location of the pointed object upon the touchpad. The electrical responses are transferred to a pen detect circuit to create a pen detect signal that will indicate that the pointed object has been placed upon that touchpad. The pen detect signal is transferred to a stroke interpreter to determine that the pointed object has made a press and move, a single tap, double tap, a tap and press without movement or a tap and press with movement motion on the touchpad to create a stroke digital code that indicates a single mouse click, a double mouse click, and a mouse click and move respectively.

The analog-to-digital set of digital codes representing the location of the pointed object upon the touch pad are also transferred to a coordinate calculator to determine the absolute coordinate location of the pointed object upon the touchpad and to create a location set of digital codes that represents the absolute coordinate location of the pointed object upon the touchpad. The location set of digital codes is transferred to a relative motion calculator which will determine the relative direction and speed of the point object as it is moved upon the touch pad and create a relative motion digital code indicating the relative direction and speed of the pointed object as it is moved upon the touchpad.

The location set of digital codes is transferred, also, to an autocursor motion controller. If the pointed object has transited from a workzone to an edgezone upon the touchpad, the autocursor motion controller will create a set of autocursor digital codes indicating that the cursor is to move upon the display screen at the speed and direction indicated prior to the transiting of the pointed object from the workzone to the edgezone of the touchpad. The autocursor motion controller will modify the set of autocursor digital codes indicating a change in the speed and direction if the pointed object is moved in a direction or speed different from the direction and speed of the pointed object at the transiting from the workzone to the edgezone. The autocursor motion controller will cease the creation of the set of the autocursor digital codes when the pointed object transits from the edgezone to the workzone.

The stroke digital code, the relative motion digital code, and the autocursor digital code are transferred to the code conversion unit which will create from these codes a set of digital codes that are the industry standard computer input mouse standard protocols.

The output of the code conversion unit will be transferred to a data interface which will create the necessary electrical signals for the touchpad mouse controller to communicate the industry standard computer input mouse protocols to the computer system.

The touchpad mouse controller has a power management system that will remove power from the touchpad mouse controller when the pointed object is not in contact with the touchpad for a predefined interval of time. The power will restored to the touchpad mouse controller when ever the computer system requests an action or the pointed object is placed upon the touchpad.

DETAILED DESCRIPTION OF THE INVENTION

Figure 3:
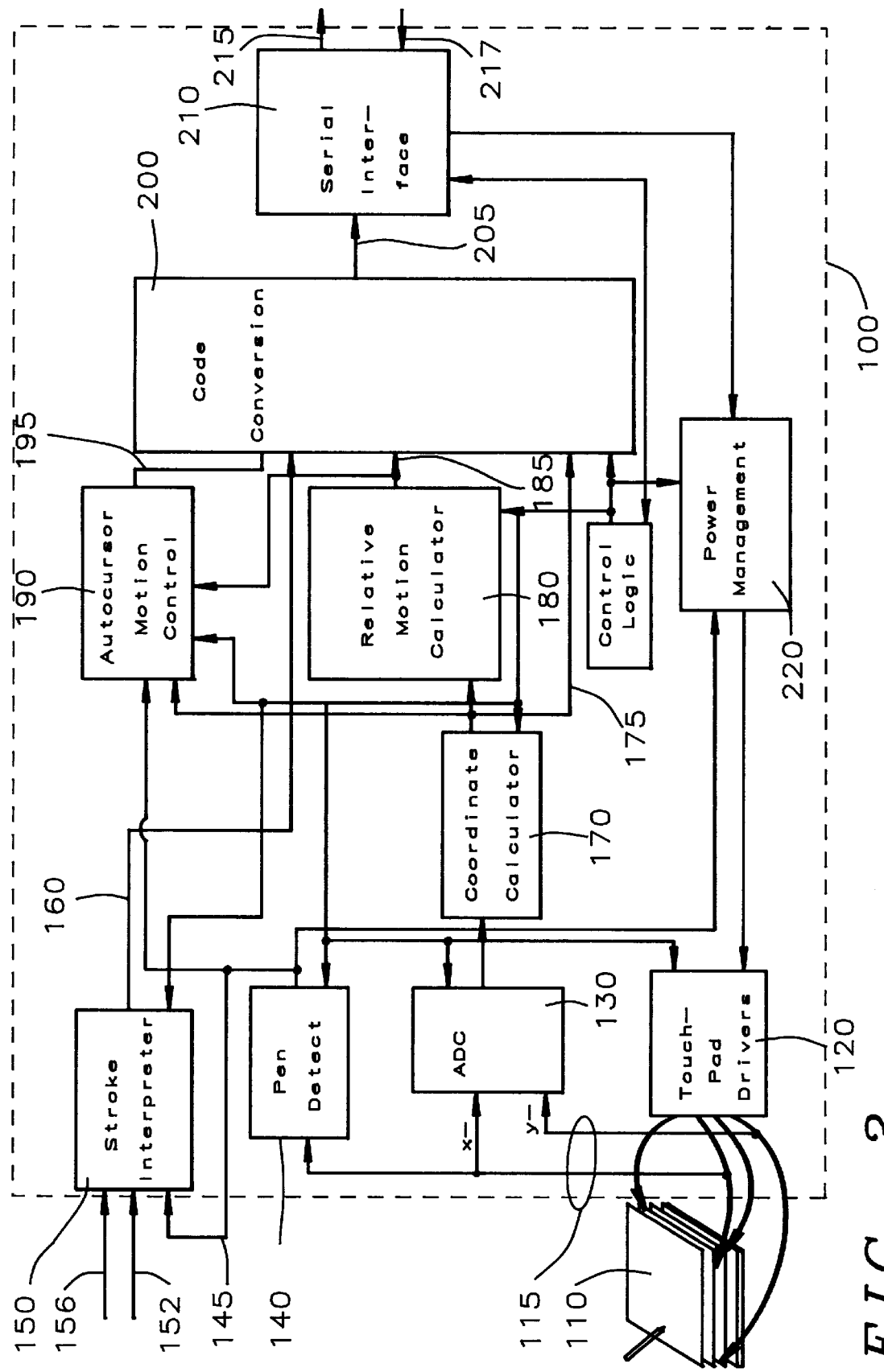
FIG. 3 is a block diagram of the touchpad control system of this invention.

Referring to FIG. 3 one embodiment of the touchpad mouse controller 100 of this invention has a touchpad driver 120 which will provide a constant current as a stimulus to the touchpad 110. The touchpad driver 120 will provide a constant current source connected to the X+ line that is connected to the X-plane of the touchpad 110 and a constant current sink is connected to the X– line that is connected to the opposite side of the X-plane of the touchpad 110. The touchpad driver 120 will provide a second constant current source connected to the Y+ line that is connected to the Y-plane of the touchpad 110 and a second current sink that is connected to the Y– line that is connected to the Y-plane on the side opposite the connection of the Y+ line. As a pointed object such as a finger, stylus, or pen is moved across the touchpad, the resistance of the film changes causing the voltage at the current sources connected to the X+ line and Y+ line and at the current sinks connected to the X– line and Y– line to vary. The voltage variation will be proportional to the distance that the contact is from the edges of the touchpad where the X+ and Y+ lines and the X– and Y– lines are attached.

The voltages present at the connections of the current sinks connected to the X– and Y– lines are coupled 115 to an analog-to-digital converter 130. These voltages are converted at regular timing intervals to a set of ADC digital codes 135 representing the amplitude of the voltages present at the connections of the current sinks connected to the X– and Y– lines that indicate the location of the pointed object pressed on the touchpad 110 surface.

The voltage present at current sink connected to the X– will be transferred to the pen detect circuit 140 which will set its output 145 to a first logic state when a change in the voltage present at the current sink connected to the X– indicates that there has been a pointed object pressed on the touchpad 110 surface. The pen detect signal 145 of the pen detect circuit 140 will assume a second state when the voltage at the current sink connected to the X– indicates that there is no object pressed on the touchpad 110 surface.

Figure 4A:
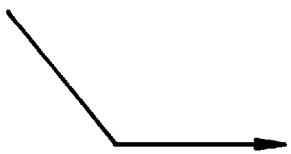
FIGS. 4a–4e are graphic sketches of the types of gestures recognized by the stroke interpreter of this invention.
Figure 4B:
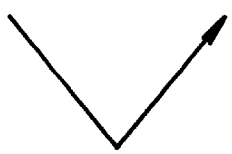
Figure 4C:
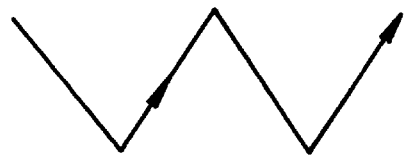
Figure 4D:
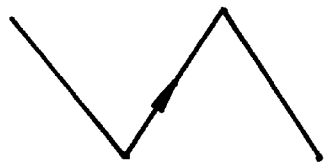
Figure 4E:
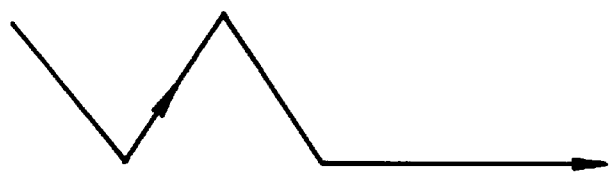
Figure 5A:
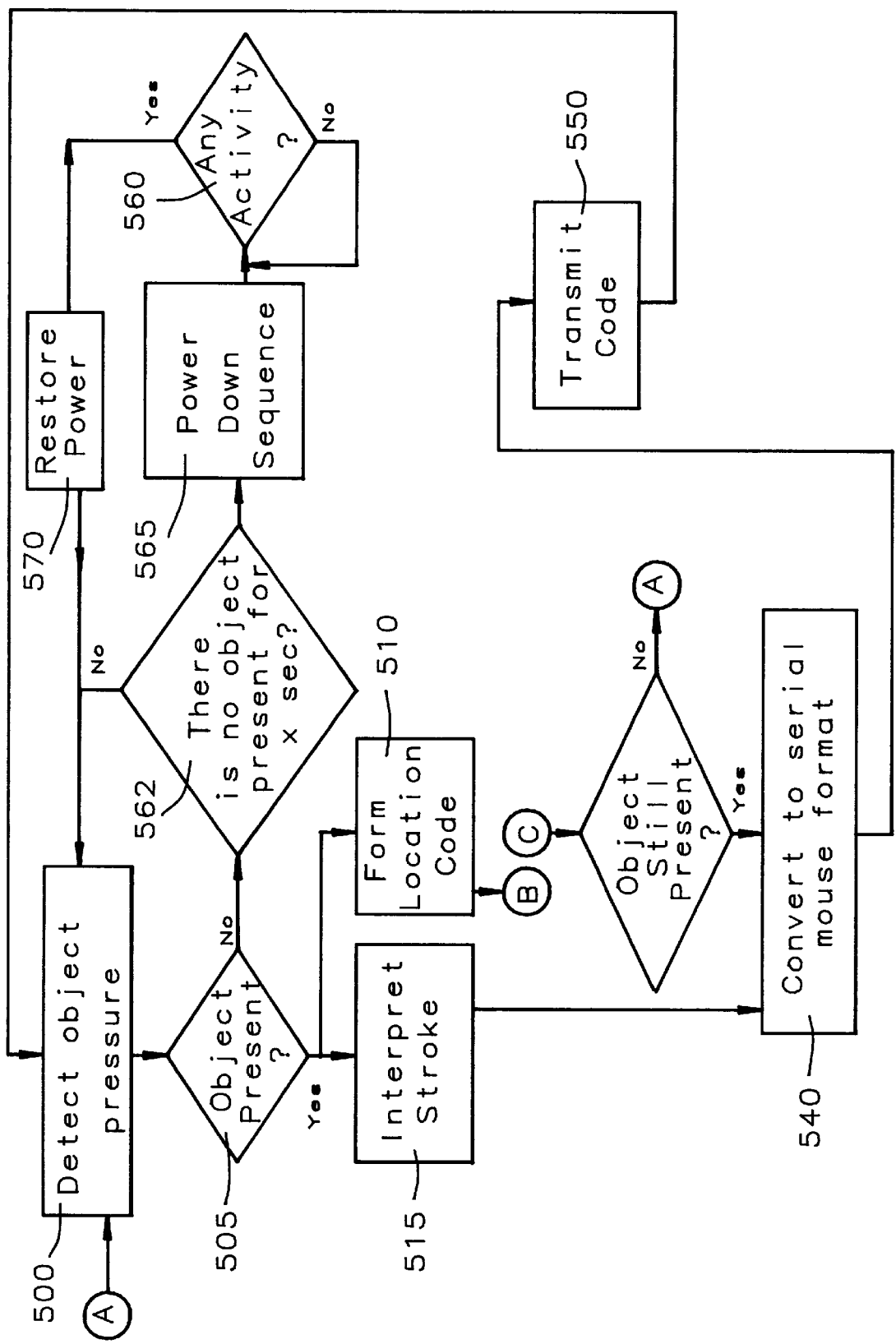
FIG. 5 is a flow chart showing the method of this invention for the control of a cursor on a display screen of a computer system using a touchpad.
Figure 5B:
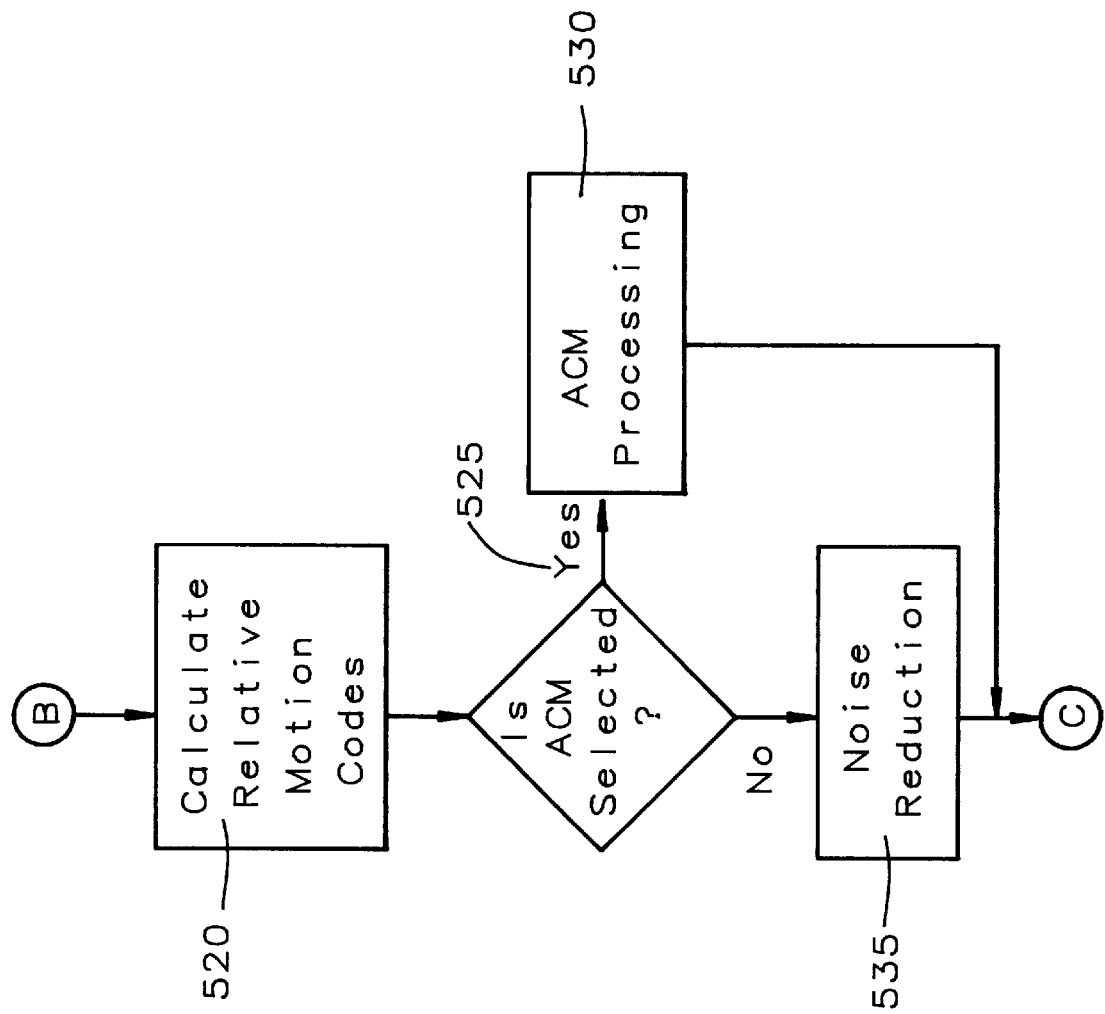

The pen detect signal 145 of the pen detect circuit 140 circuitry will be connected to the stroke interpreter 150. The stroke interpreter 150 will interpret the pen detect signal 145 to determine that certain gestures have been performed by the pointed object on the surface of the touchpad 110. The gesture include a touching and moving of the pointed object 110 upon the touchpad, a single tap of the pointed object upon the touchpad 110, a double tapping of the pointed object upon the touchpad 110, a single tap followed by a touching of the touchpad 110 by the pointed object without movement, and a single tap followed by a touching of the touchpad 110 by the pointed object with movement of the pointed object upon the touchpad 110. FIGS. 4a–4e shows the interpretation of the movements of the pointed object upon the touchpad. FIG. 4a shows the touch and move, where the pen detect signal changes from the second state to the first state. This will cause the cursor to move across the display screen. FIG. 4b shows a single tap where the pen detect signal will move from the second state to the first state and back the second state. This will be interpreted as equivalent to a single click of a mouse's primary button. FIG. 4c shows a double tap of the pointed object upon the surface of the touchpad. The pen detect signal will move from the second state to the first state, then return to the second state, back to the first state and then back to the second. The stroke interpreter will determine this motion to be equivalent to a double click of the primary button of a mouse. FIG. 4d shows a tap followed by a press with no movement. The pen detect signal will change from the second state to the first state, back to the second state and then returning to the first state where it will to remain motionless. The stroke interpreter will interpret this motion as a click and press action of a mouse where the primary button of a mouse is pressed but the mouse is not moved. FIG. 4e shows a tap action followed by a press with movement of the pointed object upon the touchpad. The pen detect signal will change from the second state to the first state, back to the second state and then returning to the first state where the pointed object will then move. The stroke interpreter will interpret this motion as a click and press action of a mouse where the primary button of a mouse is pressed but the mouse is then moved.

Returning to FIG. 3, the stroke interpreter 150 also can receive signals 20 152 and 156 from two physical buttons that maybe attached to the touchpad 110. These signals will be interpreted as the single and double clicks of the right 152 and left 156 mouse buttons.

The stroke signal 160 is the output of the stroke interpreter 150 and will contain the interpreted signals indicating the single and double "clicks", the "press", and the "press and drag" and whether the right 152 and left 156 mouse buttons have been activated.

The ADC digital codes also are transferred to the coordinate calculator 170. The coordinate calculator 170 will translate the ADC digital codes into a set of coordinate digital codes 175 indicating the coordinate position on the touchpad 110 of the pointed object being pressed on the touchpad 110 at a specific point in time. A new set of coordinate digital codes 175 will be generated with each new set of ADC digital codes at each of the regular timing intervals.

The set of coordinate digital codes 175 are transferred to the relative motion calculator 180. The relative motion calculator 180 will record multiple sets of the coordinate digital codes 175 and calculate a set of relative motion digital codes 185 that are the speed and direction of the motion of the pointed upon the surface of the touchpad 110. The set of relative motion digital codes 185 are the difference of a current set of coordinate digital codes 175 and a previous set of coordinate digital codes 175. The first sampling of the set of coordinate digital codes 175 when the pointed object is first place upon the touchpad 110, does not generate a relative motion digital codes 185, but the second sampling of the set of coordinate digital codes 175 starts the streaming of the sets of relative motion digital codes 185.

The relative motion digital codes 185 and the coordinate digital codes 175 are transferred to the autocursor motion controller 190. The autocursor controller 190 is a selectable feature that when selected, will divide the touchpad 110 surface into a workzone and an edgezone. As shown in FIG. 4, the workzone 220 is the central area of the touchpad 110. The edgezone 230 is the area near the periphery of the touchpad 110. If the pointed object is pressing the touchpad and transits a sufficient distance from the workzone into the edgezone, the autocursor motion control 190 of FIG. 3 will create a set of autocursor digital codes as the pointed object transits from the workzone 220 to the edgezone 230. The speed and direction as expressed by the relative motion digital codes 185 prior to the transiting from the workzone 220 to the edgezone 230 become a constrained speed and a constrained direction. The autocursor digital codes 195 will remain constant if the pointed object either is moving in the constrained direction and at the constrained speed or is brought to a stop. The autocursor digital codes 195 can be changed within the edgezone 230 by moving the pointed object pressing upon the touchpad 110 at a new speed and direction. If the speed is to be changed but the direction is to remain constrained, the pointed object should be moved at the new speed while maintaining the constrained direction. The autocursor digital codes 195 will be modified to increment the constrained speed to a new value. If the new speed and direction is required, the pointed object moves in the new direction for an amount sufficiently large so as to indicate a definite movement and not a random motion or wiggling of the human hand moving the pointed object upon the touchpad 110. The new direction and speed is captured from the relative motion digital codes 185 and the autocursor digital codes 195 is created indicating the new constrained speed and constrained direction.

The autocursor motion control 190 will cease to generate the autocursor digital codes 195 if the pointed object transits from the edgezone 230 to the workzone 220 of the touchpad 110.

The autocursor motion controller 190 will selectively cause the cursor to be scrolled across the display screen. Further the autocursor motion controller 190 will cause the cursor to attach to an object being displayed upon the display screen and drag the object across the display screen. Additionally, upon command from the computer system, the autocursor motion controller 190 will disable the ability to scroll and drag.

The stroke signal 160, the coordinate digital codes 175, the relative motion digital codes 185, and the autocursor digital codes 195 are transferred to the code conversion unit 200. The code conversion unit 200 will, if the mouse mode is selection line 207 is enabled, create from the stroke signal 160,175, the relative motion digital codes 185, and the autocursor digital codes 195 a mouse set of digital codes 205 that conform to industry standard computer input mouse protocols. These protocols may those that conform to the Microsoft Corporation MS Mouse standard, the International Business Machines, Incorporated PS/2 Mouse standard, the Apple Computer, Inc. Apple Desktop Bus, and other applicable mouse protocols.

The set of digital codes 205 will be transferred to the serial interface 210 where they will be serialized and buffered so as to conform to the electrical specifications of the aforementioned industry standard computer input mouse protocols. The serialized codes 215 are transferred to the computer system to the control the movement of the cursor on a display screen of the computer system.

The power management unit 220 will remove the power supply voltage source from all circuits of the touchpad mouse controller 100 except the pen detect circuit 140 and the power management unit 220, if no pointed object is detected by the pen detect circuit 140 as being in contact with the touchpad surface 110 for a long period of time. The power management 220 unit will return the power to the touchpad mouse controller 100 if an object is detected as being in contact with the touchpad surface 110 by the pen detect circuit 140 or the stroke interpreter 150 detects a left mouse button 156 or a right mouse button 152 has been pressed. The power management unit 220 will also return the power to the touchpad mouse controller 100 if the computer systems activates the serialized interface 217.

Figure 1:
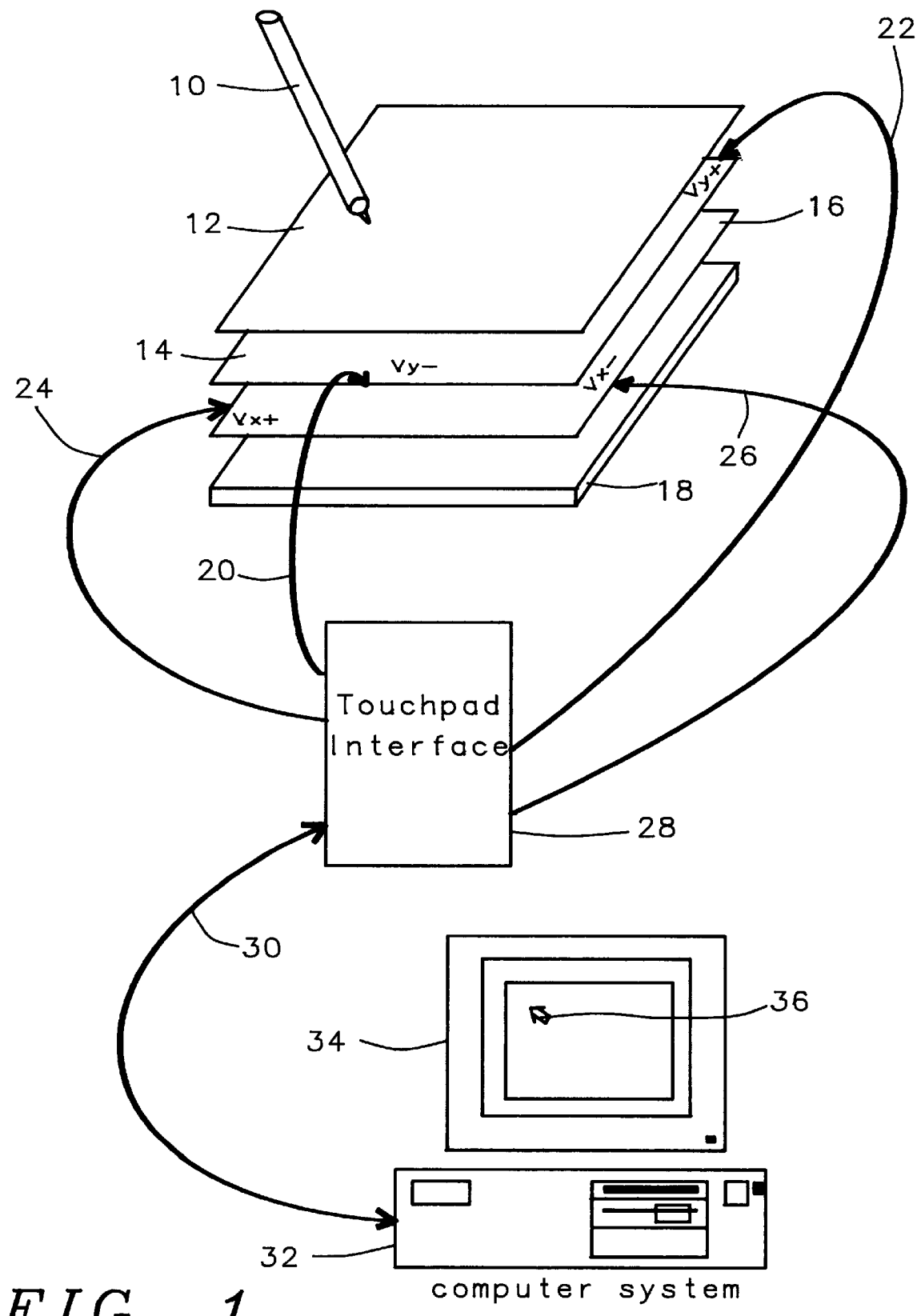
FIG. 1 is a diagram of a resistive film touchpad.
Figure 2:
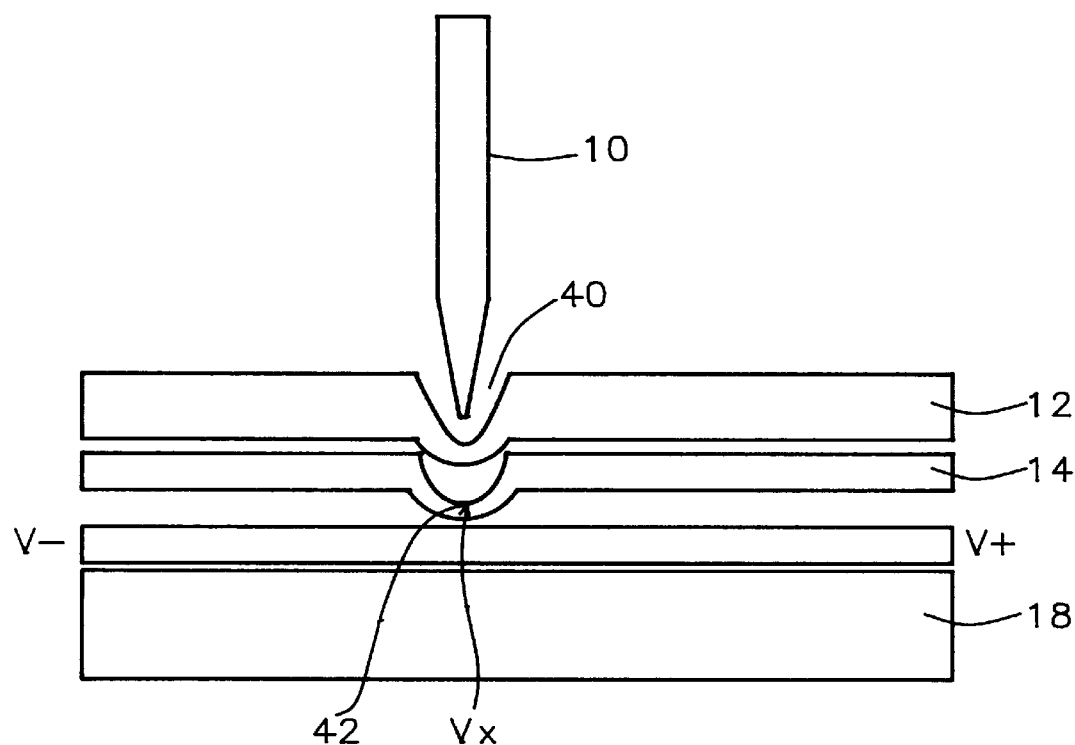
FIG. 2 is a diagram of a resistive film touchpad showing a the location of a pointed object such as a pen upon the touchpad.

FIG. 6 shows the method for the control of movements of a cursor upon a display screen of a computer system using a touchpad as shown in FIG. 1. The steps of the method are as follows:

1. Electrical responses to movements of a pointed object upon the surface of a touchpad are detected. 500
2. A presence signal that indicates the presence of the pointed object upon the surface of the touchpad is created from the electrical responses. 505
3. The detected electrical responses to the movements are converted in an analog-to-digital converter to a set of ADC digital codes indicating location of the pointed object upon the surface of the touchpad. 510
4. A location set of digital codes are calculated and formed from the ADC digital codes that indicates the coordinate position of the pointed object upon the touchpad. 510
5. A stroke signal indicating that a tap of the touchpad has occurred, a double tap has occurred, or a tap and drag has occurred is created from the presence signal. 515
6. The relative motion digital codes indicating the speed and direct ion of t he pointed object upon the touchpad are calculated from multiple sets of the location digital code. 520
7. If the location digital codes determine the pointed object has transited from a workzone area of the touchpad to an edgezone area of the touchpad 525, generating a set of autocursor motion digital codes that indicate that the cursor should scroll at a predefined speed and direction that was detected immediately prior to the transiting to the edgezone, or that the cursor should cease scrolling if the pointed object transits from the edgezone t o the workzone. 530
8. If the location digital codes indicate the pointed object has not transited from the workzone to the edgezone 527, the relative motion digital codes have a noise reduction process applied to them to reduce fluctuations in the codes from electrical noise and mechanical vibration and random movement of the pointed object upon the touch pad 535.
9. The stroke signal, the location digital code, the relative motion code, the autocursor motion code are to a mouse code that conforms to the aforementioned industry standard computer input mouse protocols. 540

10. The mouse code is transmitted 550 to the computer system to control the movements of the cursor upon the display screen of the computer system according to the codes of the industry standard mouse protocol.

11. Whenever the pointed object has not been detected as being present on the touchpad for a period of time 562, the power removed 565 of from the circuitry that will implement this method so as to conserve energy, and whenever the pointed object is detected as touching the touchpad, a right of left button is pressed upon the touchpad, or the computer system sends a request to send signal to said circuitry, power is restored to the circuitry 570.

While this invention has been particularly shown and described with reference to the preferred embodiments thereof, it will be understood by those skilled in the art that various changes in form and details may be made without departing from the spirit and scope of the invention.

What is claimed is:

1. A touchpad mouse control system connected to and separate from a touchpad, to detect movements of a pointed object upon said touchpad and to convert said movements to a mouse movement set of digital codes that conform to an industry standard computer input mouse protocol that control positioning of a cursor upon a display screen of a computer system, comprising:
   a) a touchpad driver circuit connected to the touchpad to provide an electrical stimulus to said touchpad, whereby said electrical stimulus is selected from the set of electrical stimuli consisting of electrical voltages and electrical currents;
   b) a pen detector means connected to the touchpad to convert the electrical responses to a presence signal that indicates that said pointed object has been placed upon the touchpad;
   c) an analog-to-digital converter connected to the touchpad to convert electrical responses from said touchpad that indicate location of said pointed object upon said touchpad to an analog-to-digital set of digital codes;
   d) a stroke interpreter connected to the pen detector means to decode multiple occurrences of the presence signal to create a stroke signal;
   e) a coordinate calculator connected to the analog-to-digital converter that will decode the analog-to-digital set of digital codes to form a location set of digital codes that are a coordinate location of the pointed object upon said touchpad;
   f) a relative motion calculator connected to the coordinate calculator to manipulate multiple sets of the location set of digital codes to create a relative motion set of digital codes that indicate the relative motion that is a function of the speed and direction of the pointed object upon the touchpad;
   g) an autocursor motion controller connected to the pen detector means, the coordinate calculator, and relative motion calculator:
      to interpret the location set of codes to determine if said pointed object has transited between a workzone and an edgezone of said touchpad,
      to create an autocursor set of codes that contain a predetermined relative motion set of digital codes to modify the autocursor set of codes if the location set of codes indicate that the pointed object is moving upon said touchpad in a new direction and at a new speed, whereby said predetermined relative motion set of digital codes indicate a predetermined speed and direction of the pointed object that is the speed and direction of said pointed object prior to transiting from said workzone to said edgezone and,
      to terminate the autocursor set of digital codes if the location set of codes indicates that the pointed object has transited from said edgezone to said workzone and when said pointed object has been removed from the touchpad;
   h) a code conversion unit connected to autocursor motion controller, the relative motion calculator, the stroke interpreter, and the coordinate calculator to convert the relative motion set of digital codes, the stroke signal, and the autocursor set of digital codes to the mouse movement set of digital codes; and
   i) a data interface connected to the code conversion unit to convert the mouse movement digital codes to electrical signals that conform to the industry standard computer input mouse protocols and to transmit said electrical signals to said computer system to control said positioning of said cursor.

2. The system of claim 1 further comprising a power management unit to conserve energy within said touchpad mouse control system by removing power from said touchpad mouse control system whenever said presence signal is inactive indicating absence of said pointed object from said touchpad and returning power to said touchpad mouse control system whenever said presence signal is active and whenever said computer system transmits a request signal to said data interface.

3. The system of claim 1 wherein the electrical response varies in magnitude according to the location of said pointed object upon said touchpad.

4. The system of claim 1 wherein the pointed object is selected from the set of pointed objects including a human finger, a stylus, and a pen.

5. The system of claim 1 wherein the electrical response is selected from the set of electrical responses that include a change in voltage, a change in current, and a change in frequency of an oscillating signal.

6. The system of claim 1 wherein the stroke interpreter will further decode an input signal from a left button switch and right button switch attached to said touchpad to form the stroke signal.

7. The system of claim 1 wherein the stroke signal will have:
   a) a move action value if the presence signal becomes active indicating the pointed object is present on the touchpad and is moving;
   b) a single click value if the presence signal is active for a brief period of time followed by the presence signal being inactive to indicate a single tap of the touchpad;
   c) a double click value if the presence signal is active for the brief period of time followed by the presence signal being inactive for the brief period of time followed by the presence signal being active for the brief period of time and followed by the presence signal becoming inactive to indicate a double tapping of the touchpad,
   d) a press value if the presence signal is active for a brief period of time followed by the presence signal becoming active for a long period of time with no movement of the pointed and the object upon the touchpad; and
   e) a press and drag value if the presence signal is active for the brief period of time followed by the presence signal being inactive for the brief period of time and followed by the presence signal becoming active for a long period of time to indicate a tap followed by the movement of the pointed object upon the touchpad.

8. The system of claim 7 wherein the stroke signal will have a left button value if the left button switch has been activated and a right button value if the right button has been activated.

9. The system of claim 1 wherein the relative motion set of digital codes will contain a relative speed term and a relative direction term that indicate the relative motion of the pointed object upon said touchpad.

10. The system of claim 1 wherein the autocursor motion controller selectively causes the cursor to be scrolled across the display screen, causes the cursor to attach to an object being displayed upon said display screen and to drag said object, and upon command from said computer system, disables said scrolling and dragging.

11. A computer display cursor control system to detect movements of a pointed object upon a hard surface, to convert said movements to a universal digital code that will conform to an industry standard computer input mouse protocol, and to control positioning of a cursor upon a computer display screen, comprising:

a) a touchpad having said hard surface and a touch input transducer which will convert said movements to electric responses to electrical stimuli indicating location of said pointed object upon said touchpad;

b) a touchpad driver circuit connected to the touchpad to provide electrical stimulus to said touchpad, whereby said electrical stimuli are selected from the set of electrical stimuli consisting of electrical voltages and electrical currents;

c) an analog-to-digital converter connected to the touchpad to convert electrical responses from said touchpad that indicate location of said pointed object upon said touchpad to an analog-to-digital set of digital codes;

d) a pen detector means connected to the touchpad to convert the electrical responses to a presence signal that indicates that said pointed object has been placed upon the touchpad;

e) a stroke interpreter connected to the pen detector means to decode multiple occurrences of the presence signal to create a stroke signal;

f) a coordinate calculator connected to the analog-to-digital converter that will decode the analog-to-digital set of digital codes to form a location set of digital codes that are a coordinate location of the pointed object upon said touchpad;

g) a relative motion calculator connected to the coordinate calculator to manipulate multiple sets of the location set of digital codes to create a relative motion set of digital codes that indicate the relative motion that is the a function of the speed and direction of the pointed object upon the touchpad;

h) an autocursor motion controller connected to the pen detector means, the coordinate calculator, and relative motion calculator:

to interpret the location set of codes to determine if said pointed object has transited between a workzone and an edgezone of said touchpad, to create an autocursor set of codes that contain a predetermined relative motion set of digital codes to modify the autocursor set of codes if the location set of codes indicate that the pointed object is moving upon said touchpad in a new direction and at a new speed, whereby said predetermined relative motion set of digital codes indicate a predetermined speed and direction of the pointed object that is the speed and direction of said pointed object prior to transiting from said workzone to said edgezone and, to terminate the autocursor set of digital codes if the location set of codes indicates that the pointed object has transited from said edgezone to said workzone and when said pointed object has been removed from the touchpad;

i) a code conversion unit connected to autocursor motion controller, the relative motion calculator, the stroke interpreter, and the coordinate calculator to convert the relative motion set of digital codes, the stroke signal, and the autocursor set of digital codes to the universal digital codes;

j) a data interface connected to the code conversion unit to convert the universal digital codes to electrical signals that conform to the industry standard computer input mouse protocols and to transmit said electrical signals to said computer system to control said positioning of said cursor.

12. The system of claim 11 further comprising a power management unit to conserve energy within said touchpad mouse control system by removing power from said touchpad mouse control system whenever said presence signal is inactive indicating absence of said pointed object from said touchpad and returning power to said touchpad mouse control system whenever said presence signal is active and whenever said computer system transmit a request signal to activate said data interface.

13. The system of claim 11 wherein said touchpad is selected from the set of touchpad that include capacitive touchpads, resistive touchpads, and electromagnetic touchpads.

14. The system of claim 11 wherein the electrical response varies in magnitude according to the location of said pointed object upon said touchpad.

15. The system of claim 11 wherein the electrical response is selected from the set of electrical responses that include a change in voltage, a change in current, and a change in frequency of an oscillating signal.

16. The system of claim 11 wherein the stroke signal will have:

a) a move action value is presence signal become active indicating the pointed object is present on the touchpad and is moving;

b) a single click value if the presence signal is active for a brief period of time followed by the presence signal being inactive to indicate a single tap of the touchpad;

c) a double click value if the presence signal is active for the brief period of time followed by the presence signal being inactive for the brief period of time followed by the presence signal being active for the brief period of time and followed by the presence signal becoming inactive to indicate a double tapping of the touchpad;

d) a press value if the presence signal is active for a brief period of time followed by the presence signal becoming active for a long period of time with no movement of the pointed and the object upon the touchpad; and e) a press and drag value if the presence signal is active for the brief period of time followed by the presence signal being inactive for the brief period of time and followed by the presence signal becoming active for a long period of time to indicate a tap followed by the movement of the pointed object upon the touchpad.

17. The system of claim 11 wherein the stroke interpreter will further decode an input signal from a left button switch and right button switch attached to said touchpad to form the stroke signal.

18. The system of claim 17 wherein the stroke signal will have a left button value if the left button switch has been activated and a right button value if the right button has been activated.

19. The system of claim 11 wherein the relative motion set of digital codes will contain a relative speed term and a relative direction term that indicate the relative motion of the pointed object upon said touchpad.

20. The system of claim 11 wherein the autocursor motion controller selectively causes the cursor to be scrolled across the display screen, causes the cursor to attach to an object being displayed upon said display screen and to drag said object, and upon command from said computer system, disables said scrolling and dragging.

21. A method for the control of movement of a cursor upon a display screen of a computer system, comprising the steps of:

a) providing electrical stimuli to a touchpad, whereby said electrical stimuli are selected from the set of electrical stimuli consisting of electrical voltages and electrical currents;

b) detecting electrical responses to movements of a pointed object upon the surface of a touchpad;

c) creating from the electrical responses a presence signal that indicates the presence of the pointed object upon the surface of the touchpad;

d) converting in an analog-to-digital converter the detected movements to a set of analog-to-digital set of digital codes indicating location of the pointed object upon the surface of the touchpad;

e) creating from the presence signal a stroke signal indicating that a tap of the touchpad has occurred, a double tap has occurred, or a tap and drag has occurred;

f) calculating and forming a location digital code from the analog-to-digital set of digital codes that indicates the coordinate position of the pointed object upon the touchpad;

g) calculating from multiple sets of the location digital code the relative motion digital codes indicating the speed and direction of the pointed object upon the touchpad;

h) interpreting the location digital code to determine if the pointed object has transited from a workzone area of the touchpad to an edgezone area of the touchpad and generating a set of autocursor motion digital codes that indicate that the cursor should scroll at a predetermined speed and direction and that the cursor should cease scrolling if the pointed object transits from the edgezone to the workzone;

i) converting the stroke signal, the location digital code, the relative motion code, the autocursor motion code to a mouse code that conforms to the aforementioned industry standard computer input mouse protocols; and j) transmitting the mouse code to the computer system to control the movements of the cursor upon the display screen of the computer system according to the codes of the industry standard mouse protocol.

22. The method of claim 21 wherein the detecting of the movements is an electrical response from said touchpad created by and electrical stimulus from a touchpad driver.

23. The method of claim 21 wherein the converting of the detected movements is a conversion of the electrical response in an analog-to-digital converter to the analog to digital set of digital codes.

24. The method of claim 21 wherein the creating of the stroke signal occurs in a stroke interpreter that decodes multiple occurrences of the presence signal to create a stroke signal that will have:

a move action value if the presence signal become active indicating the pointed object is present on the touchpad and is moving, a single click value if the presence signal is active for a brief period of time followed by the presence signal being inactive to indicate a single tap of the touchpad, a double click value if the presence signal is active for the brief period of time followed by the presence signal being inactive for the brief period of time followed by the presence signal being active for the brief period of time and followed by the presence signal becoming inactive to indicate a double tapping of the touchpad, the stroke signal will have a press value if the presence signal is active for a brief period of time followed by the presence signal being inactive for the brief period of time and followed by the presence signal becoming active for a long period of time with no movement of the pointed and the object upon the touchpad, and the stroke signal that will have a press and drag value if the presence signal is active for the brief period of time followed by the presence signal becoming active for a long period of time to indicate a tap followed by the movement of the pointed object upon the touchpad.

25. The method of claim 21 further comprising removing of power from the circuitry that will implement this method so as to conserve energy whenever the pointed object has not been detected as being present on the touchpad for a period of time, and restoring power to the circuitry whenever the pointed object is detected as touching the touch panel or the computer system send a request to send information from said circuitry.

26. The method of claim 21 wherein the electrical response varies in magnitude according to the location of said pointed object upon said touchpad.

27. The method of claim 21 wherein the electrical response is selected from the set of electrical responses that include a change in voltage, a change in current, and a change in frequency of an oscillating signal.

28. The method of claim 21 wherein the stroke interpreter will further decode an input signal from a left button switch and right button switch to form the stroke signal.

29. The method of claim 28 wherein the stroke will have a left button value if the left button switch has been activated and a right button value if the right button has been activated.

30. The method of claim 21 wherein the relative motion set of digital codes will contain a relative speed term and a relative direction term that indicate the relative motion of the pointed object upon said touchpad.

31. The method of claim 21 wherein the autocursor motion controller selectively causes the cursor to be scrolled across the display screen, causes the cursor to attach to an object being displayed upon said display screen and to drag said object, and upon command from said computer system, disables said scrolling and dragging.

32. The method of claim 21 wherein the code conversion unit may upon command from said computer system transmit only the location digital codes to said computer system to control the location of said cursor as an absolute location.

* * * * *

UNITED STATES PATENT AND TRADEMARK OFFICE
CERTIFICATE OF CORRECTION

PATENT NO. : 6,057,830
DATED : May 2, 2000
INVENTOR(S) : Chow Fong Chan, Maisy Mun Lan Ng, Eng Yue Ong, Xia Geng, Swee Hock Alvin Lim It is certified that error appears in the above-identified patent and that said Letters Patent is hereby corrected as shown below:

On the Title page, in Item (75), delete "Mun Lan Ng Maisy", and replace with -- Maisy Mun Lan Ng --.

Signed and Sealed this

Twenty-second Day of May, 2001

*Attest:*

NICHOLAS P. GODICI

*Attesting Officer*     *Acting Director of the United States Patent and Trademark Office*